(12) United States Patent
Canelon et al.

(10) Patent No.: US 8,636,967 B2
(45) Date of Patent: Jan. 28, 2014

(54) METAL RECOVERY FROM HYDROCONVERTED HEAVY EFFLUENT

(75) Inventors: Carlos Canelon, San Antonio de los Altos (VE); Angel Rivas, Los Teques (VE); Edgar Lopez, Los Teques (VE); Luis Zacarias, San Antonio de los Altos (VE)

(73) Assignee: Intevep, S.A., Caracas (VE)

( * ) Notice: Subject to any disclaimer, the term of this patent is extended or adjusted under 35 U.S.C. 154(b) by 0 days.

(21) Appl. No.: 12/691,234

(22) Filed: Jan. 21, 2010

(65) Prior Publication Data
US 2011/0176978 A1 Jul. 21, 2011

(51) Int. Cl.
C01G 37/00 (2006.01)
C01G 39/00 (2006.01)
C01G 41/00 (2006.01)
C22B 34/30 (2006.01)

(52) U.S. Cl.
USPC .................. 423/55; 423/53; 423/57; 423/22

(58) Field of Classification Search
USPC ..................................... 423/53, 55
See application file for complete search history.

(56) References Cited

U.S. PATENT DOCUMENTS

| | | | |
|---|---|---|---|
| 3,562,150 A | 2/1971 | Hamilton et al. | |
| 3,763,303 A | 10/1973 | Khuri et al. | |
| 3,773,890 A | 11/1973 | Fox et al. | |
| 4,015,977 A | 4/1977 | Crawford | |
| 4,145,397 A | 3/1979 | Toida et al. | |
| 4,382,068 A | 5/1983 | Rokukawa | |
| 4,401,573 A * | 8/1983 | Perrone et al. | 210/724 |
| 4,666,685 A | 5/1987 | Wiewiorowski | |
| 4,668,483 A | 5/1987 | Ladd et al. | |
| 4,670,229 A | 6/1987 | Wiewiorowski et al. | |
| 4,888,104 A | 12/1989 | Ramirez de Aqudelo et al. | |
| 4,969,988 A | 11/1990 | Jain et al. | |
| 5,124,024 A | 6/1992 | Kryzwicki et al. | |
| 2007/0025899 A1 | 2/2007 | Marcantonio | |
| 2007/0045156 A1 | 3/2007 | Khadzhiev et al. | |
| 2008/0156700 A1* | 7/2008 | Abulnaga et al. | 208/251 R |
| 2009/0136400 A1 | 5/2009 | Bhaduri | |

FOREIGN PATENT DOCUMENTS

| | | |
|---|---|---|
| EP | 0487368 A2 | 5/1992 |
| FR | 2611745 A1 | 9/1988 |
| GB | 2456537 A * | 7/2009 |
| JP | 61171582 | 8/1986 |
| KR | 20000001579 A | 1/2000 |

OTHER PUBLICATIONS

Database WPI, Week 200676, Thomson Scientific, London, GB; AN 2006-729415 XP002634513, & CN 1 766 087 A (Shanghai Qishun Biotech Co Ltd), May 3, 2006.
Extended European Search Report for Application No. 10008521.6 dated Apr. 28, 2011.
Office action dated Jul. 15, 2013.

* cited by examiner

*Primary Examiner* — Melvin C Mayes
*Assistant Examiner* — Melissa Stalder
(74) *Attorney, Agent, or Firm* — Bachman & LaPointe, P.C.

(57) ABSTRACT

A metal recovery process for heavy effluent from a hydroconversion process. The effluent contains unconverted residue and a solid carbonaceous material containing group 8-10 metal, group 6 metal, and vanadium and/or nickel, and the metals are recovered according to the invention.

8 Claims, 9 Drawing Sheets

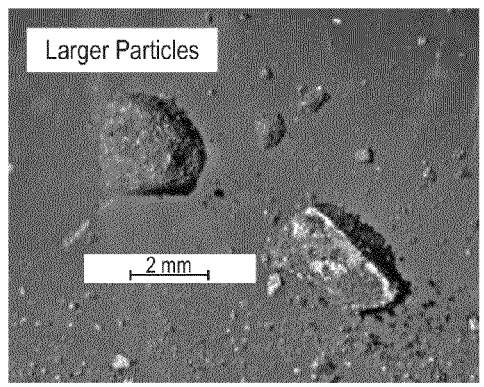
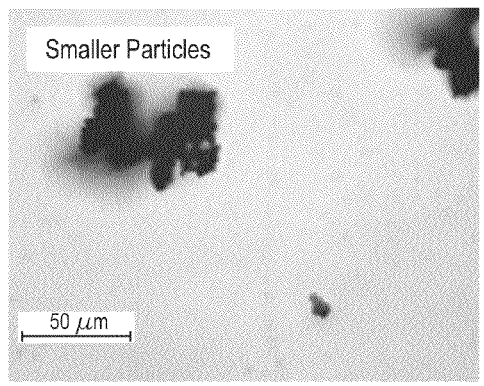
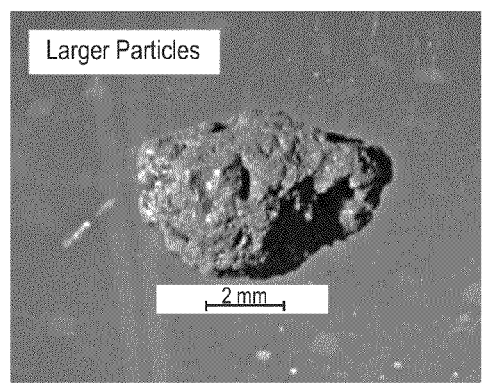
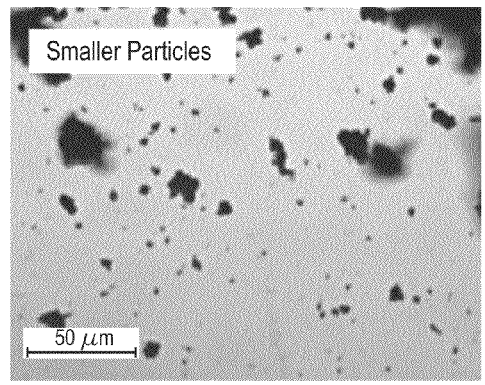
Before washing with toluene
After washing with toluene
FIG. 9a
FIG. 9b

METAL RECOVERY FROM HYDROCONVERTED HEAVY EFFLUENT

BACKGROUND OF THE INVENTION

The invention relates to a metal recovery process from a heavy product obtained by a hydroconversion process.

Metal recovery processes are frequently part of hydroconversion processes due to the expensive metals used as catalysts. A complete description of the hydroconversion process that feeds the metal recovery process described here as the invention, is disclosed in co-pending and commonly owned U.S. patent application Ser. No. 12/691,205.

As part of the metal recovery process, a solid separation process is used for extracting fine particles of the stream that comes from the hydroconversion process, one example of such a process is disclosed in a commonly owned U.S. Pat. No. 4,732,664, wherein solids particles are separated from the unconverted residue by agglomeration and later precipitation, which diminishes combustion or thermal oxidation unit size, making the recovery process less expensive.

With respect to catalyst and other metal recovery, the need remains for effective methods to recover such metals efficiently and without creating other undesirable by-products.

SUMMARY OF THE INVENTION

In accordance with the catalytic hydroconversion process, an additive is mixed with the feedstock and one of its functions is to scavenge catalyst metals and also metals from the feedstock, and to concentrate them in a heavy stream or unconverted residue material which exits the process reactor. This heavy stream can be treated to recover the metals. The stream also can be processed into flake-like materials. These flakes can then be further processed to recover the catalyst metals and other metals in the flakes, which originated in the feedstock, or can be sold. This advantageously allows the metals to be used again in the process, or to be otherwise advantageously disposed of.

According to the invention, a heavy stream from a hydroconversion process is obtained and used as source material for the metal recovery process. The hydroconversion process comprises the steps of feeding a heavy feedstock containing vanadium and/or nickel, a catalyst emulsion containing at least one group 8-10 metal and at least one group 6 metal, hydrogen and an organic additive to a hydroconversion zone under hydroconversion conditions to produce an upgraded hydrocarbon product and a solid carbonaceous material containing said group 8-10 metal, said group 6 metal, and said vanadium. The product, or just the solid carbonaceous material, is used as feedstock to the metal recovery process.

The additive used in the hydroconversion process is preferably an organic additive, and may preferably be selected from the group consisting of coke, carbon blacks, activated coke, soot and combinations thereof. Preferred sources of the coke include but are not limited to coke from hard coals, and coke produced from hydrogenation or carbon rejection of virgin residues and the like.

The additive can advantageously be used in a process for liquid phase hydroconversion of feedstocks such as heavy fractions having an initial boiling point around 500° C., one typical example of which is a vacuum residue.

In the hydroconversion process, the feedstock is contacted in the reaction zone with hydrogen, one or more ultradispersed catalysts, a sulfur agent and the organic additive. While the present additive would be suitable in other applications, one preferred process is carried out in an upflow co-current three-phase bubble column reactor. In this setting, the organic additive can be introduced to the process in an amount between about 0.5 and about 5.0 wt % with respect to the feedstock, and preferably having a particle size of between about 0.1 and about 2,000 μm.

Carrying out the hydroconversion process as described herein the organic additive scavenges catalyst metals from the process, for example including nickel and molybdenum catalyst metals, and also scavenges metals from the feedstock, one typical example of which is vanadium, concentrating these metals in an unconverted residue, which contains the solid carbonaceous material, called Hot Separator Bottom Product (HSBP). This unconverted residue can be processed into solids, for example into flake-like materials, containing heavy hydrocarbon, the organic additive, and concentrated catalyst and feedstock metals. These flakes are a valuable source of metals for recovery as discussed above.

A process is provided for recovering metals from a starting material comprising solid carbonaceous material contained in the unconverted residue from a hydroconversion process, using six different schemes.

BRIEF DESCRIPTION OF THE DRAWINGS

A detailed description of preferred embodiments of the invention follows, with reference to the attached drawings, wherein:

FIGS. 9a and 9b illustrate micrography of particles from crushed flakes, before and after being washed with toluene, respectively.

DETAILED DESCRIPTION

The invention relates to a metal recovery process from a heavy product obtained from a hydroconversion process, which uses a carbonaceous additive. The additive acts as a scavenger of catalyst and feedstock metals, and concentrates them in a residual phase for later extraction.

Six different schemes of metal recovery are disclosed herein as examples of metal recovery according to the invention. These all act on a stream 71 of heavy product as shown in FIGS. 2-7.

Figure 2:
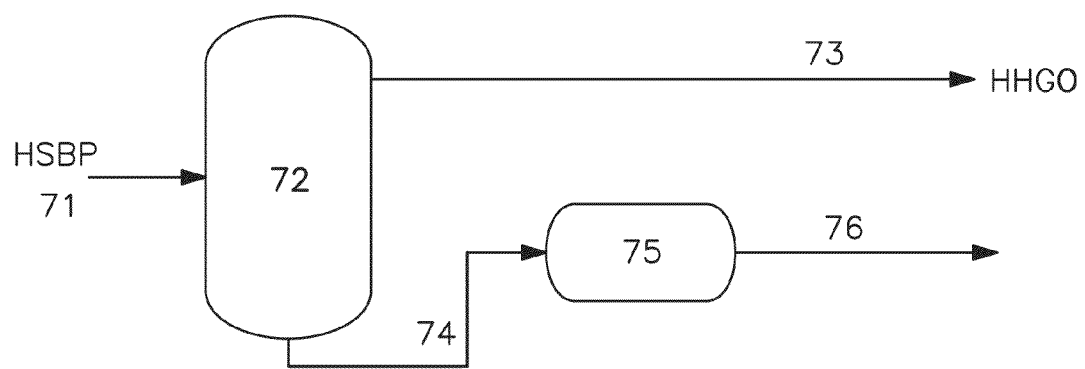
FIG. 2 shows scheme 1 of a metal recovery process according to the invention.

FIG. 2 corresponds to scheme 1 as referred to herein, and uses a vacuum tower 72 to treat stream 71. Tower 72 produces HHGO 73 and stream 74 which can be fed to a flaker unit 75 to produce flakes 76.

Figure 3:
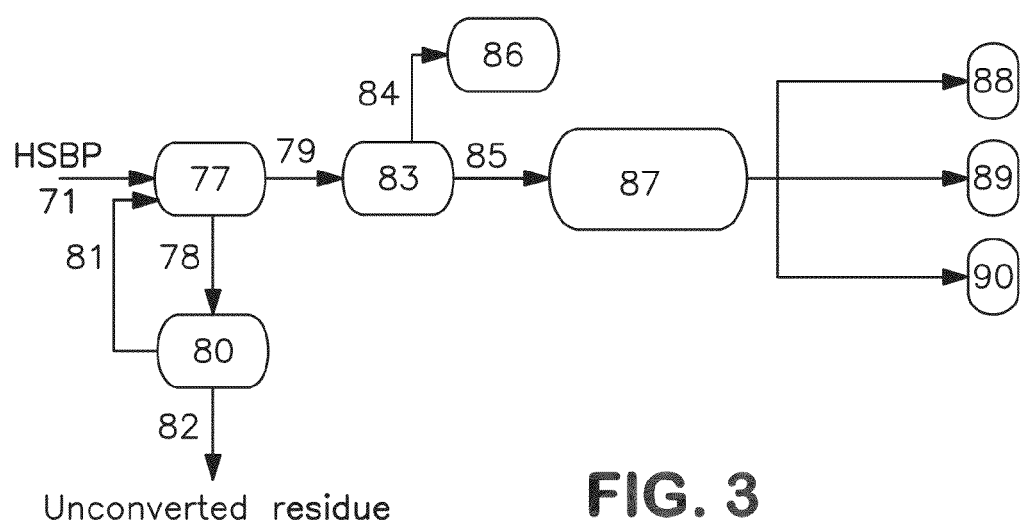
FIG. 3 shows scheme 2 of a metal recovery process according to the invention.

FIG. 3 corresponds to scheme 2 as referred to herein and uses a solvent extraction/addition unit 77 to treat stream 71.

Unit 77 treats stream 71 and produces a heavy product through line 78 to flash tower 80, and a lighter product through line 79 to thermal treatment unit 83.

Flash tower 80 produces unconverted residue through line 82, and a recycle fraction through line 81 back to unit 77.

Thermal treatment unit 83 produces a metal rich stream through line 85 to metal recovery unit 87 and a gas product through line 84 to gas treatment unit 86.

Metal recovery unit 87 produces streams rich in the specific metals to be recovered, for example ammonium metavanadate, or AMV, in line 88, ammonium heptamolybdate tetrahydrate, or AHM, in line 89 and nickel acetate in line 90.

Figure 4:
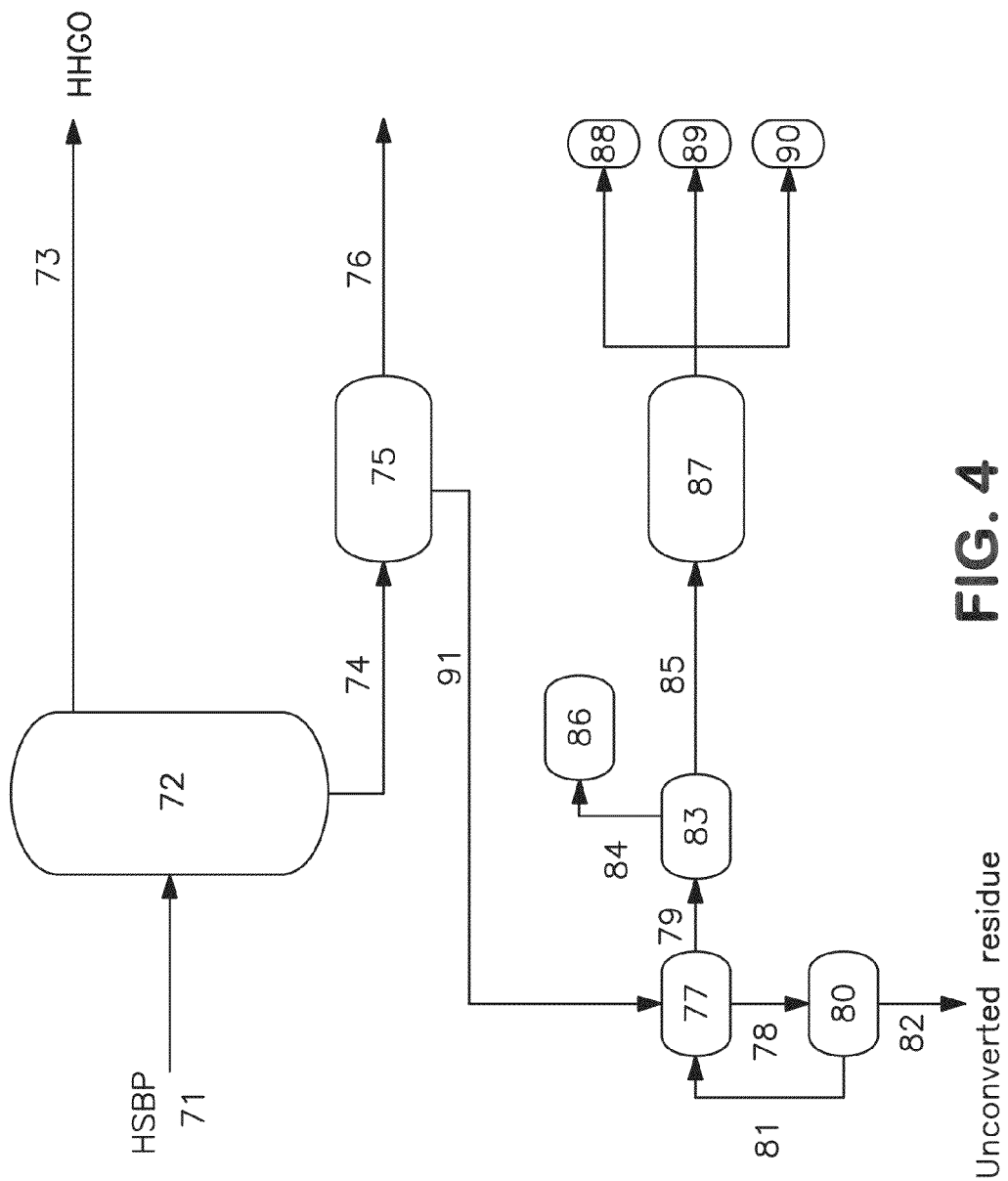
FIG. 4 shows scheme 3 of a metal recovery process according to the invention.

FIG. 4 corresponds to scheme 3 as referred to herein and uses a vacuum distillation unit 72 to treat stream 71 and produce HHGO through line 73 and a heavy stream 74 which is fed to flaker unit 75. Product 76 as in the embodiment of FIG. 2 is forwarded to a subsequent use or sale as desired, and a metal rich stream is fed through line 91 through solvent/extraction addition unit 77 from where processing is conducted similarly to what is described above with respect to FIG. 3, which is not repeated here.

Figure 5:
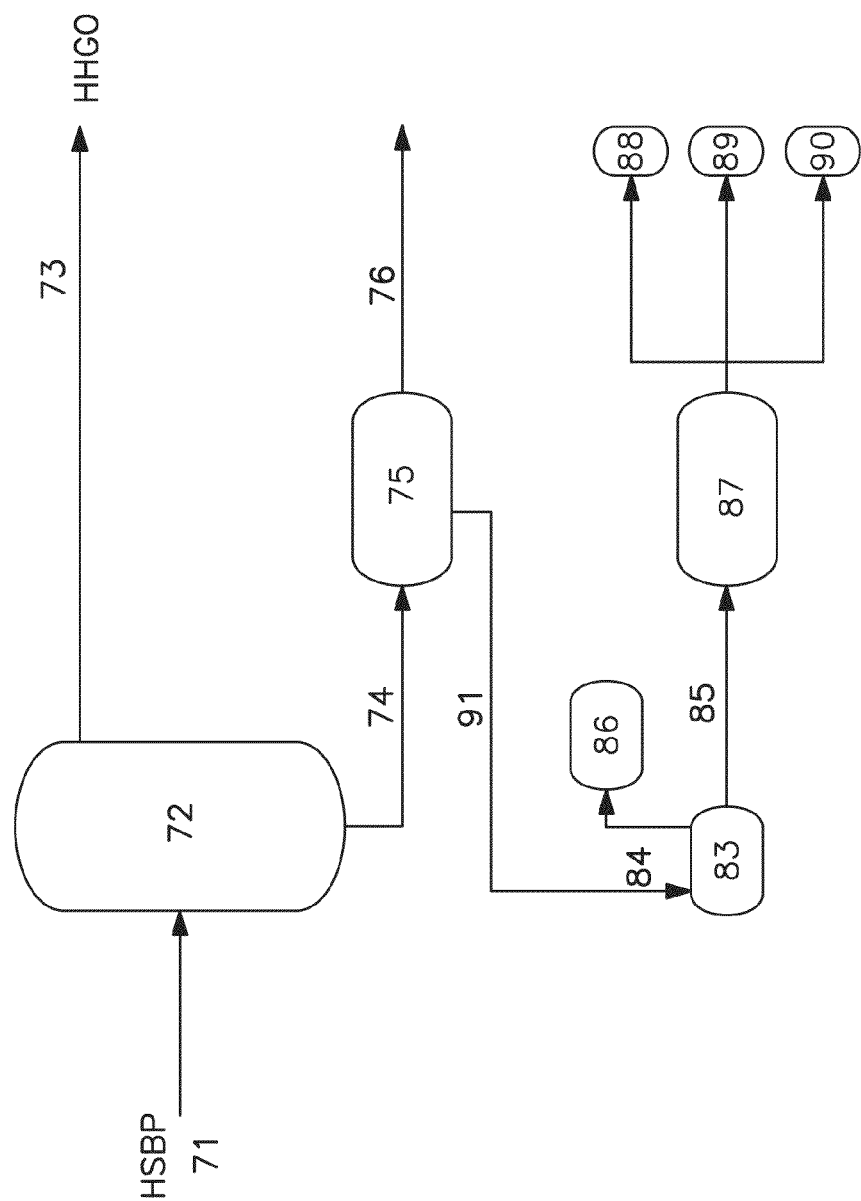
FIG. 5 shows scheme 4 of a metal recovery process according to the invention.

FIG. 5 corresponds to scheme 4 as described herein and uses a scheme similar to FIG. 4. As shown, processing of stream 71 is carried out as in FIGS. 2 and 4, and stream 74 is fed to flaker unit 75. Line 91 from flaker unit 75 in this case connects directly to thermal treatment unit 83, with no solvent/extraction addition unit as in FIG. 4. From unit 83, processing continues as discussed above with respect to FIGS. 3 and 4.

Figure 6:
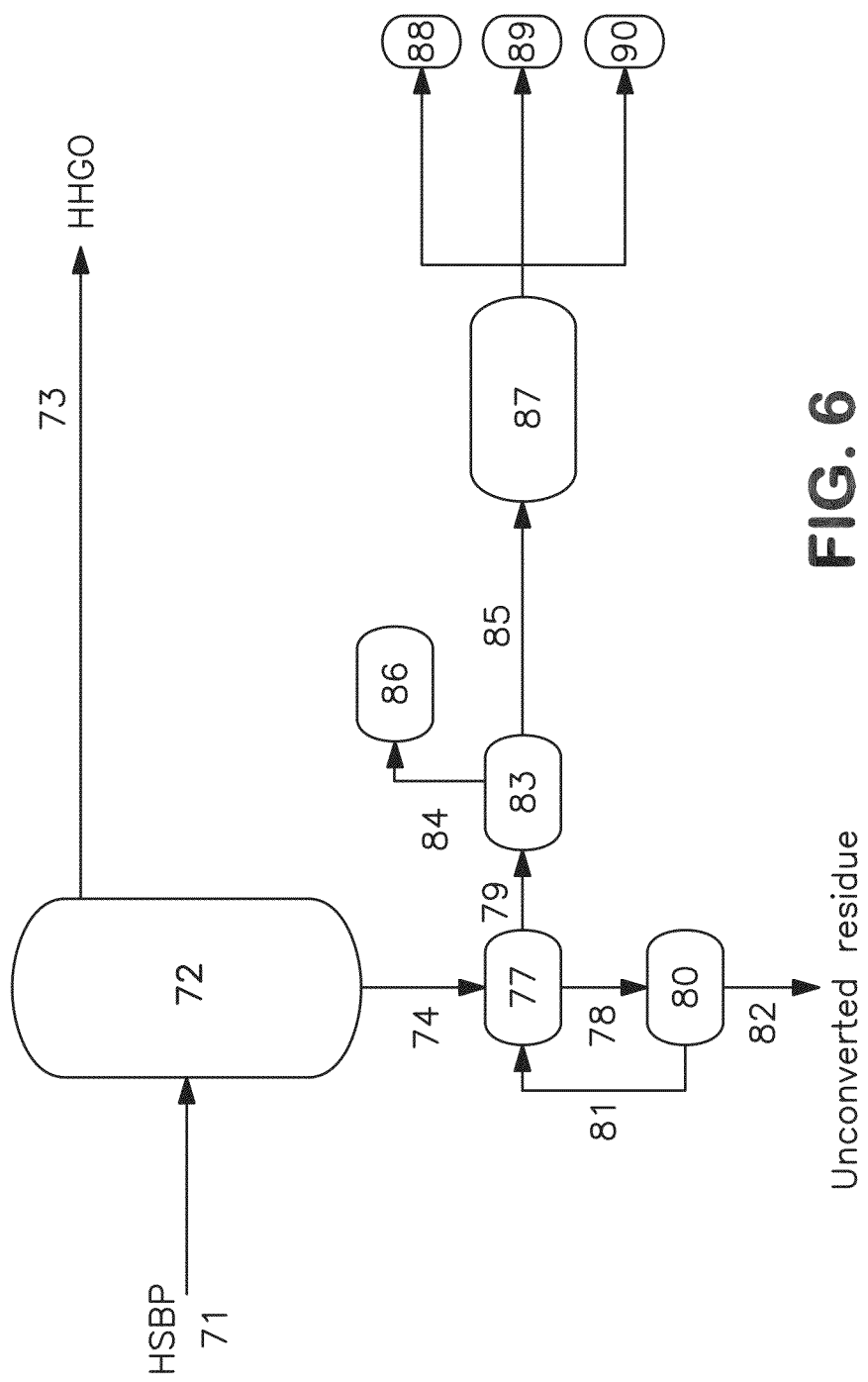
FIG. 6 shows scheme 5 of a metal recovery process according to the invention.

FIG. 6 corresponds to scheme 5 as referred to herein, and shows an embodiment wherein stream 74 is fed directly to solvent/extraction addition unit 77, processing continues as described above with respect to FIGS. 3 and 4.

Figure 7:
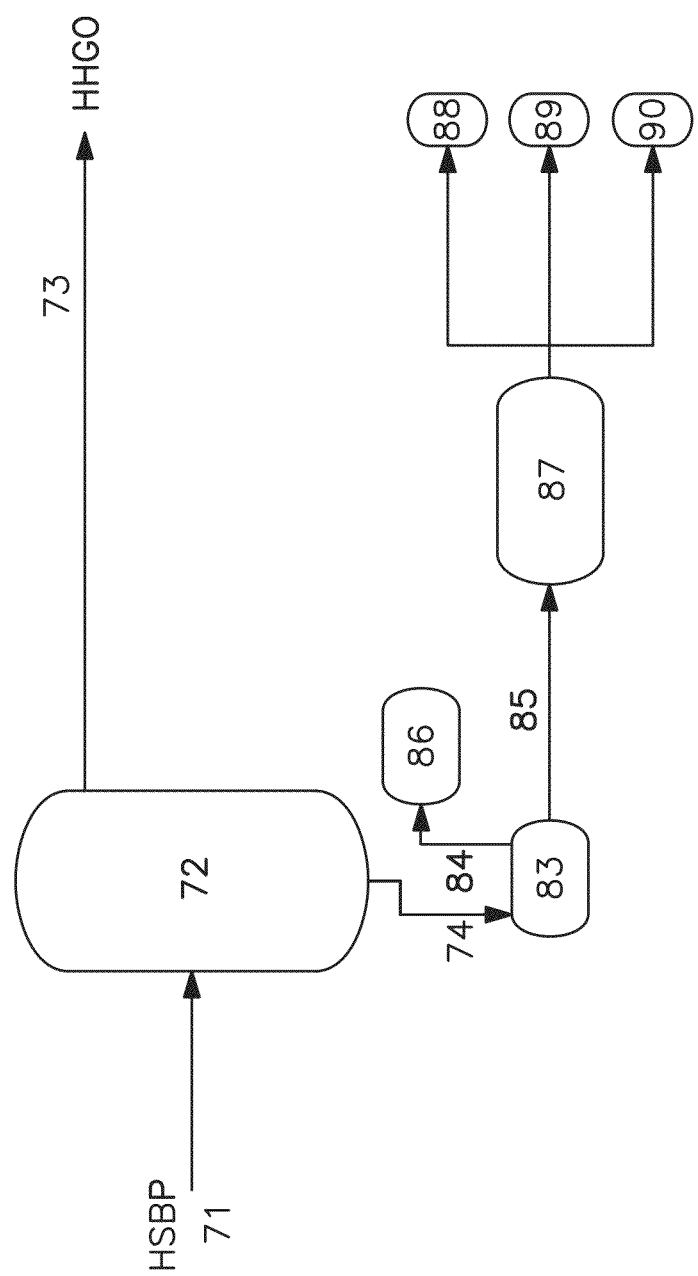
FIG. 7 shows scheme 6 of a metal recovery process according to the invention.

FIG. 7 corresponds to scheme 6 as referred to herein and shows an embodiment wherein stream 74 from vacuum distillation unit 72 is fed directly to thermal treatment unit 83. Processing from unit 83 is as discussed above with respect to FIGS. 3-6.

Figure 1:
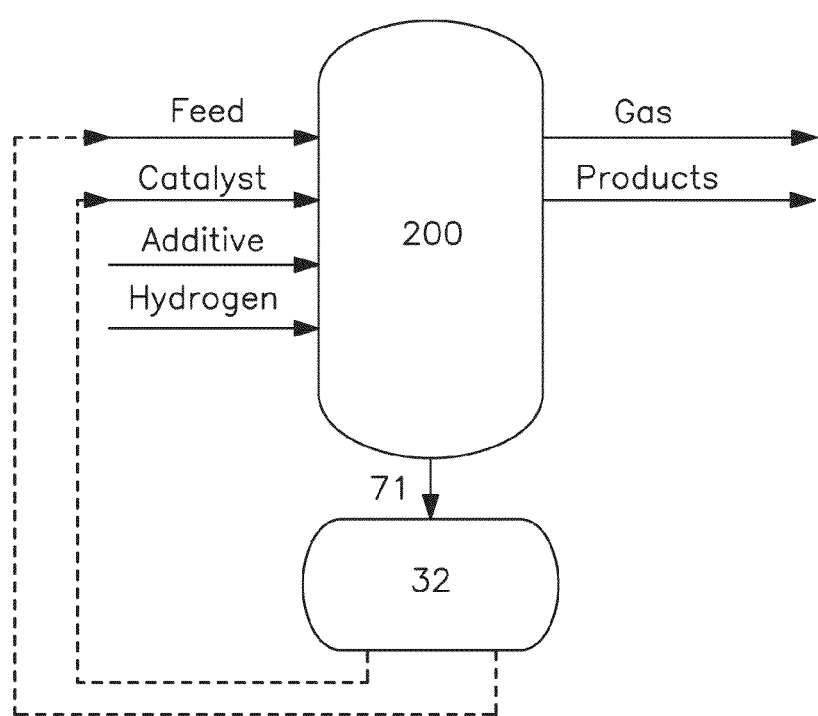
FIG. 1 schematically illustrates a hydroconversion process that creates the feed to the metal recovery process.

A brief description of this hydroconversion process is given here, using the unit 200 in FIG. 1. In this hydroconversion process the feedstock, containing vanadium and/or nickel, is contacted with a catalyst consisting of one, two or more emulsions (water in oil), containing at least one group 8-10 metal and at least one group 6 metal, under hydroconversion conditions, which may include high hydrogen partial pressure and high temperature, and also an additive having as one of its purposes, to concentrate the metals over its surface, making metal recovery process easier.

Within unit 200, conversion of the feedstock occurs, and the outflows from unit 200 include a product stream including an upgraded hydrocarbon phase which can be separated into liquid and gas phases for further treatment and/or feeding to a gas recovery unit as desired, and a residue containing the additive which can be solidified or separated in a stream rich in solids, to be fed to the metal recovery unit, and unconverted vacuum residue, which can be recycled.

The feedstock for the hydroconversion process can be any heavy hydrocarbon, and one particularly good feedstock is vacuum residue which can have properties as set forth in Table 1 below:

TABLE 1

| Properties | Unit | |
|---|---|---|
| Distillation LV % ASTM D1160 | | |
| IBP | ° F. | 600-900 |
| Viscosity@210° F. | cst | <80000 |
| API | — | 1-7 |

TABLE 1-continued

| Properties | Unit | |
|---|---|---|
| Sulfur | wt % | 3-8 |
| Nitrogen | wt % | <2 |
| Asphaltenes | wt % | 15-30 |
| Conradson Carbon | wt % | 15-30 |
| Metal (V + Ni) | wtppm | 200-2000 |

Alternative feeds include but are not limited to feeds derived from tar sands and/or bitumen.

For a vacuum residue (VR) feedstock, this can come from a vacuum distillation unit (VDU) for example, or any other suitable source. Other similar feeds can be used, especially if they are of a type that can be usefully upgraded through hydroconversion and contain feedstock metals such as vanadium and/or nickel.

As indicated above, the additive is preferably an organic additive such as coke, carbon black, activated coke, soot, and combinations thereof. These materials can be obtained from any of numerous sources, and are readily available at very low cost. The organic additive can preferably have a particle size of between about 0.1 and about 2,000 μm.

The catalysts used are preferably a metal phase as disclosed in co-pending U.S. Ser. No. 12/113,305. The metal phase advantageously is provided as one metal selected from groups 8, 9 or 10 of the periodic table of elements, and another metal selected from group 6 of the periodic table of elements. These metals can also be referred to as group VIA and VIIIA metals, or group VIB and group VIIIB metals under earlier versions of the periodic table.

The metals of each class are advantageously prepared into different emulsions, and these emulsions are useful as feed, separate or together, to a reaction zone with a feedstock.

The group 8-10 metal(s) can advantageously be nickel, cobalt, iron and combinations thereof, while the group 6 metal can advantageously be molybdenum, tungsten and combinations thereof. One particularly preferred combination of metals is nickel and molybdenum.

The hydroconversion process, as disclosed in simultaneously filed U.S. patent application Ser. No. 12/691,205, can use more than two mentioned metals. For example, two or more metals from group 8, 9 or 10 can be included in the catalyst phases of the emulsions.

The catalyst emulsion(s) and heavy feedstock can be fed to the reactors preferably in amounts sufficient to provide a ratio of catalyst metals to heavy feedstock, by weight, of between about 50 and about 1,000 wtppm.

Hydrogen can be fed to the process from any suitable source.

The reaction conditions for the hydroconversion process can be as set forth in Table 2 below:

TABLE 2

| Reactor Pressure | 130-210 barg |
|---|---|
| Reactor Temperature | 430-470° C. |
| Conversion Rate | 80% or more |

According to the invention, in a slurry feed process according to the invention, the unit 200 receives a vacuum residue (VR). The additive particles can be added to the VR, in a concentration between 0.5-5 wt % respect to the feedstock, and agitated. The agitated slurry is preferably pumped up to an elevated pressure, preferably over 200 barg, by high-pressure slurry pumps. The slurry is also heated to an elevated temperature, preferably over 400° C. Upstream, catalyst emulsions, sulfur agent and hydrogen are injected unto the slurry feed. After a slurry furnace for heating the slurry, more hydrogen can be added if needed.

The total mixture of VR, organic additive, catalyst emulsions, sulfur agent and hydrogen are introduced into the reactor and deeply hydroconverted into the desired lighter materials. Most of the hydroconverted materials are separated as vapor in a High Pressure High Temperature separator, and the vapor can be sent to a later unit for hydrotreating and further hydrocracking as needed.

In the meantime, the bottom product of the separator (HSBP), in the form of a heavy slurry liquid, stream 71 in FIG. 1, can be sent to a vacuum distillation unit 72 to recover, under vacuum, HHGO (heavy hydroconverted gasoil) that can be used in emulsion preparation, and the final remaining bottom residue, which is the unconverted residue, that could be sent to different types of processes where it can be converted into a solid material. One of these units could be a flaker unit 75 wherein the bottom residue can be solidified. These resulting flakes can advantageously have a composition as shown in Table 3:

TABLE 3

| | |
|---|---|
| Physical state and appearance | Solid brittle |
| API | −5-(−14.4) |
| Color | Brilliant Black |
| Volatility | Negligible at room temperature |
| Boiling Point | Greater than 500° C. |
| Density at 15° C. (kg/m$^3$) | 900-1350 |
| Toluene Insoluble (wt %) | 15-40 |
| Asphaltenes (IP-143) (wt %) | 30-50 preferably 30-40 |
| Heptane Insoluble (wt %) | 28-50 |
| Carbon Residue (Micron method) (wt %) | 22-55 |
| Molybdenum (wtppm) | 1500-5000 |
| Vanadium (wtppm) | 1400-6500 |
| Nickel (wtppm) | 50-3000 |
| Carbon Content (wt %) | 85-93 |
| Hydrogen Content (wt %) | 5-9 |
| Ratio Carbon/Hydrogen | 10-17 |
| Total Nitrogen (wt %) | 1.-2.5 |
| Sulfur (wt %) | 2.2-2.7 |
| VGO (%) | 6-14 |
| Ash (wt %) | 0.2-2.0 |
| Volatile Matter (wt %) | 60-80 |
| Heating Value BTU/Lb | 15700-16500 |
| Moisture (wt %) | 0-8.00 |
| Hardness index (HGI) | 50-68 |
| Softening Point (° C.) | 110-175 |
| Kinematic Viscosity at 275° F. (cSt) | 13,000-15,500 |
| Flash Point (° C.) | 300-310 |
| Pour Point (° C.) | 127 |
| Simulated distillation (D-7169) | % OFF(wt %)   T (° C.) |
| | IBP   442.9 |
| | 1   445.6 |
| | 5   490.7 |
| | 10   510.9 |
| | 15   527.0 |
| | 20   541.9 |
| | 25   557.7 |
| | 30   574.9 |
| | 40   618.9 |
| | 50   668.5 |
| | 58   715.0 |

The hot separator bottoms can have various uses, several non-limiting examples of which will be discussed below.

Flakes, produced as described in FIG. 2, containing remaining organic additive and also the catalyst metals and metal from the feedstock which is scavenged by the catalyst according to the process of the present invention, can themselves be provided to consumers as a source of useful metals, or can be used as fuel, or can be treated for extraction of the metals for re-use as process catalyst and the like.

For the metal extraction process, the feed selected (flakes or bottom of vacuum distillation tower) is converted into a form from which the metals can be recovered. The recovery of the metals should be carried out in a two-stage process. The first stage is to concentrate metals and the second to extract catalysts metals and origin metals like vanadium.

Any suitable process to concentrate metals from stream 71 of FIG. 1 can be used, and thermal treatment and/or solvent extraction are preferred.

In the case where the starting materials are the resulting unconverted residue and solid carbonaceous products (stream 71 of FIG. 1) from the disclosed hydroconversion process, these materials are first preferably converted to ash.

Any suitable thermal treatment can be utilized in the thermal assembly (unit 83 in the embodiments of FIGS. 3, 4, 5, 6 and 7), for example by exposing them to high temperature to burn off hydrocarbons and other materials leaving the ash and metals for further treatment.

In one embodiment, the thermal treatment is carried out sufficient for removing at least 50 wt % of the carbon or hydrocarbon material present in the heavy effluent of the hydroconversion process.

In order to maximize hydrocarbon removal from the heavy effluent of the hydroconversion process without altering the concentrations of the Mo, Ni and V metals, it is advantageous to carry out roasting at relatively low temperatures.

After unit 83 a gas treatment 86 should be carried out in stream 84 to remove sulfur and nitrogen oxides, for example using flue-gas de-sulfurisation and denox units.

Heat generated by unit 83 can advantageously be used to generate steam for use in the refinery and/or to generate power from very high pressure steam.

As described above another process preferred to concentrate metals is solvent extraction/addition. An extracting medium is employed for the extraction/separation of the unconverted oil from the additive. In one embodiment, the extraction medium is a composition comprising a light specific gravity solvent or solvent mixture, such as, for example, xylene, benzene, toluene, kerosene, reformate (light aromatics), light naptha, heavy naphta, light cycle oil (LCO), medium cycle oil (MCO), propane, diesel boiling range material and the like.

When solvent extraction/addition is used, a residual oil can be recovered and recycled to unit 200 in FIG. 1.

A second stage comprises an acid or basic lixiviation.

After the recovery metal process, metals recovered can be used to generate a fresh catalyst or can be sold.

Solvent/extraction addition unit (77) allows not only removing the asphaltenes but also removes very fine particles.

In one embodiment, the washing/mixing with solvent (i.e., solvent extraction) is done in a separate tank.

For the separation of the solid and liquid phases, any technique known in the art can be employed, including but not limited to centrifugal force enhanced settling devices such as centrifuges, filtering centrifuges, decanter centrifuges and cyclonic separators.

After unit 77, solvent can be recovered by using a flash tower (unit 80 in FIGS. 3, 4 and 6), wherein the solvent and the unconverted residue are separated, and the solvent can be recycled to unit 77, and the unconverted residue can be recycled to unit 200, or recycled to the refinery or to be otherwise advantageously disposed of.

Of course, the metals to be recovered include not only the catalyst metals used in the process, but also certain metals such as vanadium which are native to the feedstock.

The resulting materials from unit 77 are first preferably converted to ash, for example by exposing them to high temperature (83) to burn off hydrocarbons and other materials leaving the ashes and metals for further treatment in the unit 87, having as a result ammonium metavanadate (88), ammonium heptamolybdate (89) and nickel acetate (90).

The term "extract" may be used interchangeably with "separate" or "recover" (or grammatical variations thereof), denoting the separation of heavy oil from additive and catalyst.

Figure 8:
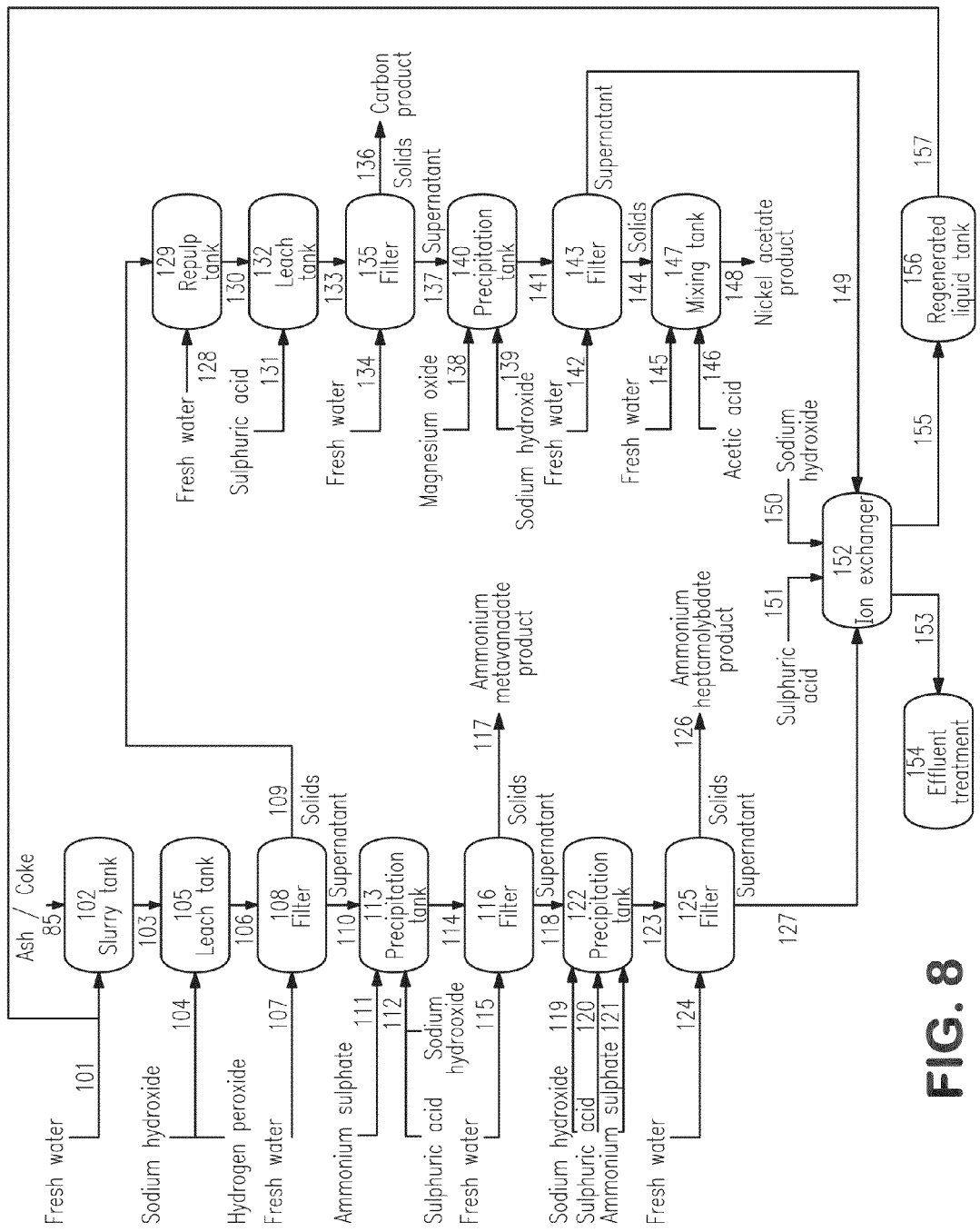
FIG. 8 illustrates the metal recovery unit.

Turning now to FIG. 8, a further specific process is illustrated for recovering metals from ashes and/or solid carbonaceous material containing such metals. These starting materials for the metal recovery process can be one of the end products of the process discussed above, or other similar processes which produce similar materials.

As shown in FIG. 8, the starting material (stream 85) can be ash or coke.

Vanadium Extraction Process

The feed (line 85) is fed to the slurry tank 102 to make it a slurry by using fresh water (line 101) and mixing with regenerated liquids (line 157), from the regenerated liquids storage tank 156.

The slurried feed (line 103) is transferred to the vanadium leach tank 105. In the leach tank the vanadium is leached into sodium hydroxide solution (line 104), with a concentration between 20-60% wt and most preferably in the range from 40 to 55% wt. Additionally, it is necessary to add a small amount of hydrogen peroxide solution (line 104) to the leach slurry to ensure the vanadium remains in the correct oxidation state.

The pH of the leach process should be maintained between 5 and 10, and most preferably in the range of 8 to 9. The leach temperature is maintained between 10 and 40° C., and most preferably, in the range of 25 to 35° C. The nickel will remain in an insoluble form. The reaction between sodium hydroxide and vanadium pentoxide to produce sodium metavanadate is shown below:

$$2NaOH + V_2O_5 \rightarrow 2NaVO_3 + H_2O$$

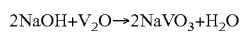

The slurry (line 106) goes to the leach filter 108 to separate the supernatant from the insoluble solids. Wash water (line 107) is fed to filter 108 to remove entrained metals from the carbon/nickel filtercake. Both the solids and the wash water are transferred via line 109 to the slurry tank 129 in the nickel extraction section. The supernatant (line 110), rich in vanadium and molybdenum, will be pumped to the ammonium metavanadate (AMV) precipitation tank 113

The vanadium is precipitated as AMV by the addition of a solution of ammonium sulphate (line 111) with a concentration between 10 and 50 wt %, and most preferably in the range of 20 to 40% wt. Additionally some sodium hydroxide solution and sulfuric acid solution (line 112) might be needed for adjusting pH. The precipitation temperature is maintained between 5-30° C., and most preferably in the range of 7 to 15° C. The precipitation reaction is shown below $$2NaVO_3 + (NH_4)2SO_4 \rightarrow 2NH_4VO_3 + Na_2SO_4$$

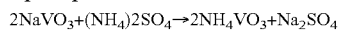

The solid AMV in line 114 is recovered in the AMV filter 116 by washing it with cold clean water (line 115) to remove entrained filtrate from the cake. The line 117 consists of the AMV product and filter washings. The supernatant (line 118), rich in molybdenum and residual vanadium, is transferred to the ammonium heptamolybdate tetrahydrate (AHM) precipitation tank 122

Molybdenum Extraction Process

The molybdenum oxides contained in the supernatant are dissolved in alkali solution (line 119), with a concentration between 30 and 60% wt and most preferably in the range of 40 to 55% wt. In this condition, the simple molybdate anion is produced.

The pH of resultant alkaline solution into tank 122 is reduced by addition of a solution of sulfuric acid (line 120) with a concentration between 10 and 60 wt %, and most preferably in the range of 35 to 55% wt. In this condition, the first species to be formed is heptamolybdate rather than any of the smaller anions.

The molybdenum is precipitated as ammonium heptamolybdate tetrahydrate (AHM) by the addition of a solution of ammonium sulphate (line 121) with a concentration between 10 and 50 wt %, and most preferably in the range of 20 to 40% wt. The precipitation temperature is maintained between 0 and 30° C., and most preferably in the range of 5 to 15° C. The precipitation reactions are shown below $$MoO_3 + 2NaOH + 6Na_2MoO_4 + 4H_2SO_4 + 3(NH_4)2SO_4 \rightarrow$$
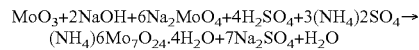
$$(NH_4)6Mo_7O_{24} \cdot 4H_2O + 7Na_2SO_4 + H_2O$$

The solid AHM (line 123) is recovered in the AHM filter 125 by washing with cold clean water (line 124) to remove entrained filtrate from the cake. The line 126 consists of the AHM product and filter washings. The supernatant (line 127), with residual vanadium and molybdenum is transferred to ion exchange unit 152 where a sodium hydroxide solution (line 150) and sulfuric acid solution (line 151) are used as regenerators. The resulting effluent (line 153) is sent to the effluent treatment system, while the regenerated liquid (line 155) is pumped to the regenerated liquids storage tank 156.

Nickel Extraction Process

The carbon, nickel, residual vanadium and residual molybdenum (line 109) from filter 108 are fed to a repulp tank 129 and mixed with fresh water (line 128).

The outcome (line 130) from repulp tank 129 is transferred to the nickel leach tank 132 where it is leached with sulfuric acid solution (line 131), with a concentration between 10 and 60 wt %, and most preferably in the range of 35 to 55% wt, to produce nickel sulfate (line 133). The leach temperature is maintained between 10 and 40° C., and most preferably in the range of 25 to 35° C. The nickel leach reaction is shown below:

$$Ni(OH)_2 + H_2SO_4 \rightarrow NiSO_4 + 2H_2O$$

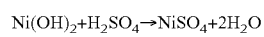

The products of the reaction (line 133) are filtered through the leach filter 135 to separate the supernatant from the insoluble carbon product. Wash water (line 134) to clear traces of entrained metals from the carbon is fed to filter 135. Both the solids (mostly carbon, and residual amounts of nickel, vanadium and molybdenum) and the wash water make up the carbon product stream leaving the plant (line 136). The supernatant (line 137), containing a nickel rich solution, and residual amounts of carbon, vanadium and molybdenum is transferred to the nickel precipitation tank 139.

Nickel is precipitated from the filtrate as nickel hydroxide with magnesium oxide slurry (line 138) in the nickel precipitation tank 140. Additionally some sodium hydroxide solution (line 139) might be needed for adjusting pH. The precipitation temperature is maintained between 40 and 70° C., and most preferably in the range of 55 to 65° C. The precipitation reaction is shown below:

$$MgO + NiSO_4 + H_2O \rightarrow Ni(OH)_2 + MgSO_4$$

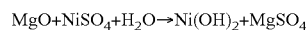

The solid nickel hydroxide (line 141) is recovered in the nickel filter 143 by washing it with cold clean water (line 142) to remove entrained filtrate from the cake. The line 144 consists of the precipitated nickel hydroxide and the filter washings. The supernatant (line 149), with residual amounts of nickel, vanadium and molybdenum is transferred to ion exchange unit 152.

The nickel hydroxide (line 144) is transferred to the nickel re-slurry tank 147 where water (line 145) and 100 wt % acetic acid (146) are added to produce the final product, nickel acetate tetrahydrate (line 148). The reaction is shown below $$2H_2O + Ni(OH)_2 + 2CH_3COOH \rightarrow Ni(CH3COO)_2 \cdot 4H_2O$$

It should be noted that other solutions and materials can be used in place of those disclosed herein in order to leach and precipitate materials as discussed, well within the broad scope of the present invention.

EXAMPLE 1

Solvent Extraction

This example illustrates metal scavenger capability of the carbonaceous additive.

In this example, flake-like material containing the unconverted vacuum residue and the remaining organic additive was used to quantify the metal content and metals mass balance of the hydroconversion process.

In this example the remaining organic additive was separated by using a desolidification procedure with toluene as solvent. Following the scheme represented in FIG. 2, flakes were generated in unit 75 and the following experiment was conducted.

10.00 g of flakes were dissolved in 100 ml of hot toluene, this mixture was then centrifuged at 1500 rpm for 20 minutes to separate the unconverted residue of the additive. The solids were decanted and washed using toluene Soxhlet extraction, which is a continuous extraction method whereby fresh solvent continuously flows through the compound to be extracted. After that, the solids were dried in a vacuum oven for two hours at 130° C. The unconverted vacuum residue was recovered by evaporating the toluene. In this example the amount of dried solids was 4.9 g.

FIGS. 9a and 9b show micrography of particles before and after being washed with toluene.

Finally, the metal content in solids and in the unconverted vacuum residue was determined by inductively coupled plasma (ICP) coupled to a OES.

Table 4. shows Mo, Ni and V content of flakes, additive and the unconverted vacuum residue.

TABLE 4

Metals concentrations in the Flakes, Additive and the non-converted vacuum residue

|  | Mo | Ni | V | Fe |
| --- | --- | --- | --- | --- |
| Flakes analyses (wtppm) | 1977 | 1183 | 2103 | 459 |
| Dried Solid Additive analyses (wtppm) | 3812 | 2790 | 3984 | 822 |
| Calculated metal in dried solids[a] (wtppm) | 1868 | 1367 | 1952 | 403 |
| Metal recovery ratios[b] (wt %) | 94.5 | 115.6 | 92.8 | 87.8 |
| Non-converted vacuum residue | <5.0 | 65 | 65 | <5.0 |

Experimental conditions

| Solvent | Toluene |
| --- | --- |
| Measured Flakes (g) | 10.00 |
| Measured dried solids (g) | 4.90 |

[a]Calculated Metals in Dried Solids = Dried Solids Analysis * Measured Dried Solids (g)/Measured Flakes (g).
[b]Some yields above 100% - within experimental error.

EXAMPLE 2

Thermal Oxidation Treatment

This example illustrates a thermal oxidation treatment to concentrate metals.

In this example, the same flake-like material described in Example 1, containing the unconverted vacuum residue and the remaining organic additive were used and the following experiment was conducted for thermal oxidation treatment.

The C, H, N and S contents in the flakes were determined (Table 5).

TABLE 5

C, H, N and S content in Flakes

|  | C (wt %) | H (wt %) | N (wt %) | S (wt %) |
| --- | --- | --- | --- | --- |
| Flakes analyses (wtppm) | 87.34 | 6.52 | 1.78 | 1.78 |
| Standard deviation | 0.5813 | 0.0436 | 0.0212 |  |

A Lenton Thermal Designs (LTD) Limited tubular furnace that can operate up to 1200° C. was used for large scale roasting of the flakes. Approximately 150 g of flakes were placed in the middle of a quartz tube and glass wool was used to hold it. The quartz tube was 1 m in length and had a 5.5 cm internal diameter. The tube was inserted in the tubular furnace and the sample was heated from room temperature to 500° C. at a heating rate of 5° C./min in a nitrogen atmosphere. Afterwards, the gas flow was switched to air and the temperature was held constant at approximately 500° C. for 20-22 hours. The resulting ashes were passed through a sieve of 53 microns to remove non-combusted particles of flakes and any residual glass wool used to keep the bitumen in the center of the quartz tube.

ICP analyses were carried out in the chars obtained at 500° C. after 1.5 hours in nitrogen, the ashes obtained at 500° C. after 20 hours in air, (Table 6). All the ash samples were sieved below 53 microns before performing the ICP analyses. Different samples were produced at 500° C. in air for 20-22 hours from different batches of flakes.

Additional tests were also carried out at thermal oxidation conditions which involved heating the ashes (produced by roasting the flakes at 500° C. for 20-22 hours), at 5° C./min and holding the final temperature for 1 hour.

TABLE 6

Metal concentrations in the ashes after roasting and after thermal oxidation in the tubular furnaces.

|  | Mo (wtppm) | Ni (wtppm) | V (wtppm) |
| --- | --- | --- | --- |
| Flakes analyses | 1977 | 1183 | 2103 |
| Char from tubular reactor @ 500° C. for 1.5 hours in N$_2$ | 4197 | 2096 | 3826 |
| Standard deviation | 121 | 31 | 68 |
| Ash from tubular reactor @ 500° C. for 20 hours in air | 200965 | 99155 | 199374 |
| Standard deviation | 9786 | 4863 | 10422 |
| Ash from Low T tubular furnace and Thermal oxidation @ 900° C. for 1 hour | 221000 | 172721 | 202741 |
| Standard deviation | 4332 | 2079 | 2832 |

From these results (Table 6), it is clear that a significant increase of metal concentration in the ashes was achieved.

EXAMPLE 3

Metal Extractions

Following the scheme represented in FIG. 8, the following experimentation was effected.

Stage 1 Leach—Molybdenum and Vanadium Leach

Sodium hydroxide was selected as leach agent.

Leaching was carried out using 150% of the stoichiometric amount of sodium hydroxide solution under the following experimental conditions (Table 7).

TABLE 7

| Experimental conditions for leaching | |
|---|---|
| Temperature | 20° C. |
| Solid:liquid ratio | 1:10 g/ml |
| Mixing time | 2 hours |

The slurry was then filtered.

The solids retained by the filter were washed thoroughly with water, and dried to constant weight at 105° C. The supernatant (plus wash water) and insoluble solids were analyzed for metal content and weighed to allow a metal balance to be completed.

The metal balance over the first leaching process showed that 97.43 wt % of the molybdenum and 97.30 wt % of the vanadium had been leached into solution.

The insoluble solids contained 2.55 wt % of the total molybdenum and 2.80% of the total vanadium.

The metals balance presented in Table 8 below shows the split between solids and liquids (supernatants) as a percentage of the total metals in the feed.

TABLE 8

| Metals Balance - Stage 1 Leach | | |
|---|---|---|
| | Solid (wt %) | Supernatant (wt %) |
| Molybdenum | 2.55 | 97.43 |
| Vanadium | 2.80 | 97.30 |
| Nickel | 99.98 | 0.01 |

Ammonium Metavanadate Precipitation

The separation of the vanadium from the molybdenum is achieved by selective precipitation. Ammonium metavanadate (AMV) is produced by adding ammonium sulphate to a pregnant liquor at pH 7.8.

The experiment was carried out using the supernatant from the first leach process as described previously at ambient temperature, with a residence time of 12 hours. The slurry was then filtered. The solids retained by the filter were washed thoroughly with water, and dried to constant weight at 50° C. The supernatant (plus wash water) and insoluble solids were analyzed for metals content and weighed to allow a metals balance to be completed.

The metals balance presented in Table 9 below, shows the split between solids and liquids (supernatants) as a percentage of the total metals in the feed.

TABLE 9

| Metals Balance - Ammonium Metavanadate Precipitation | | |
|---|---|---|
| | Solid (wt %) | Supernatant (wt %) |
| Molybdenum | 1.03 | 98.43 |
| Vanadium | 97.20 | 2.64 |
| Nickel | 46.00 | 50.00 |

Ammonium Heptamolybdate Precipitation

The molybdenum is precipitated from solution as ammonium heptamolybdate (AHM) by addition of ammonium sulphate in acid conditions.

The experiment was carried out using the supernatant from the first leach process as described previously at ambient temperature, with a residence time of 12 hours.

The slurry was then filtered. The solids retained by the filter were washed thoroughly with water, and dried to constant weight at 50° C. The supernatant (plus wash water) and insoluble solids were analyzed for metal content and weighed to allow a metal balance to be completed.

The metal balance is presented in Table 10 below, and shows the split between solids and liquids (supernatants) as a percentage of the total metals in the feed.

TABLE 10

| Metal Balance for the Precipitation of Ammonium Heptamolybdate | | |
|---|---|---|
| | Solid (wt %) | Supernatant (wt %) |
| Molybdenum | 98.83 | 1.13 |
| Vanadium | 82.11 | 17.32 |
| Nickel | 0.00 | 99.9 |

Stage 2 Leach—Nickel Leach

The solids collected from the first leaching stage contain all of the carbon and nickel along with traces of the vanadium and molybdenum. It is proposed to leach the nickel into solution using a weak solution of sulfuric acid.

The nickel will form a soluble sulfate of nickel sulfate, ($Ni_2SO_4$).

Leaching was carried out using 110% of the stoichiometric amount of sulfuric acid solution under experimental conditions as listed in Table 11:

TABLE 11

| Experimental conditions for leaching | |
|---|---|
| Temperature | 20° C. |
| Solid:liquid ratio | 1:10 g/ml |
| Mixing time | 2 hours |

The molybdenum and vanadium should remain in the solid phase as they are insoluble in weak acids at low temperatures when in their full oxidized state. Any un-oxidized molybdenum and vanadium will be leached into solution along with the nickel and may co-precipitate with the nickel hydroxide. Table 12 shows the results,

TABLE 12

| Metal Balance for the Leaching of Nickel Sulfate | | |
|---|---|---|
| | Solid (wt %) | Supernatant (wt %) |
| Molybdenum | 91.41 | 3.27 |
| Vanadium | 89.15 | 5.66 |
| Nickel | 0.27 | 99.71 |

The lack of vanadium and molybdenum observed in the nickel stream (supernatant) is consistent with the concept that metals are present in the fully oxidized states. This is to be expected given that the ash was produced by thermal oxidation and is an important advantage.

Nickel Hydroxide Precipitation

The nickel was recovered from the supernatant recovered during the nickel leaching process (described previously)

through the addition of magnesium oxide and sodium hydroxide to precipitate nickel hydroxide.

The precipitation of $Ni(OH)_2$ occurs most favorably at a temperature of about 50° C., and a pH of >8. This was taken as the basis for these experiments. A residence time of 12 hours was selected.

The slurry was then filtered. The solids retained by the filter were washed thoroughly with water, and dried to constant weight at 105° C.

The supernatant (plus wash water) and insoluble solids were analyzed for metal content and weighed to allow desired measures such as metal balance to be completed. These examples demonstrate that metals from the flakes can be effectively and efficiently recovered according to the invention.

The present disclosure is provided in terms of details of preferred embodiments. It should also be appreciated that these specific embodiments are provided for illustrative purposes, and that the embodiments described should not be construed in any way to limit the scope of the present invention, which is instead defined by the claims set forth below.

The invention claimed is:

1. A process for recovering metals from a starting material comprising the steps of:
   conducting a hydroconversion process by contacting a heavy hydrocarbon feedstock, an unsupported catalyst emulsion and an organic additive under hydroconversion conditions to produce upgraded product and a solid carbonaceous material and unconverted residue, the solid carbonaceous material and unconverted residue being a starting material and containing the organic additive and metals to be recovered, the metals being selected from the group consisting of vanadium, group 8-10 metals and group 6 metals;
   converting the starting material into ash containing the metals to be recovered;
   leaching the ash with a leaching solution to form a first solid containing the group 8-10 metals and carbonaceous solid material and a supernatant containing the vanadium and group 6 metal;
   mixing the supernatant with an ammonium sulfate solution to produce a precipitate containing the vanadium, and a further supernatant containing the group 6 metal; and
   mixing the further supernatant with an alkali solution, ammonium sulfate solution and a sulfuric acid solution to produce a precipitate containing the group 6 metal.

2. The process of claim 1, wherein the group 8-10 metal is selected from the group consisting of nickel, cobalt, iron and combinations thereof.

3. The process of claim 1, wherein the group 6 metal is selected from the group consisting of molybdenum, tungsten and combinations thereof.

4. The process of claim 1, wherein the starting material comprises flakes of a solid carbonaceous material containing the group 8-10 metal, the group 6 metal, and vanadium.

5. The process of claim 4, wherein the flakes have a carbon content of between about 85 and about 93 wt %.

6. The process of claim 1, further comprising mixing the first solid with a sulfuric acid solution to produce a solid carbon product and a supernatant containing the group 8-10 metals; and mixing the supernatant with a sodium hydroxide solution and a magnesium oxide solution to produce a solid containing the group 8-10 metals.

7. The process of claim 6, further comprising the step of mixing the solid containing the group 8-10 metals with acetic acid to produce a group 8-10 metals acetate product.

8. The process of claim 1, wherein the ash material contains each of vanadium, group 8-10 metals and group 6 metal.

* * * * *